L. PULLIAM.
Draft Attachment for Wagons.
No. 222,306. Patented Dec. 2, 1879.
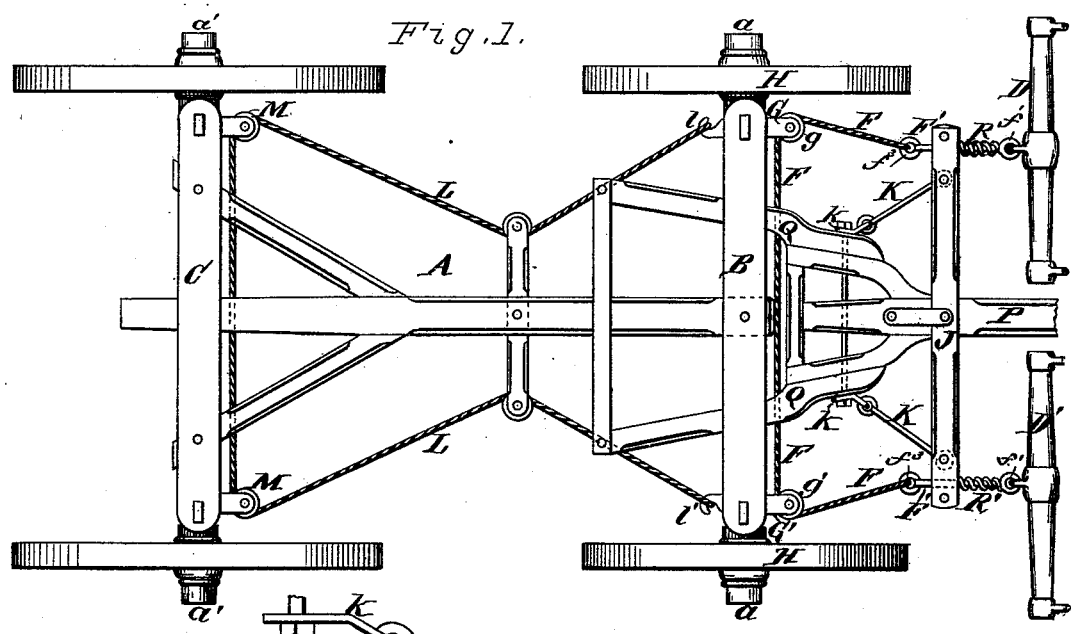
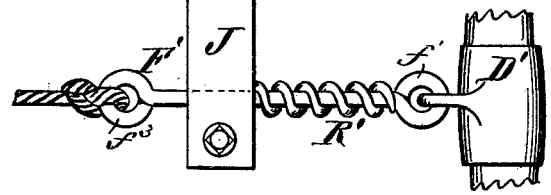
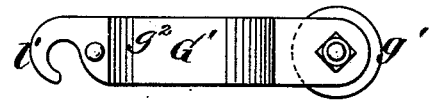
ATTEST,
Charles Pickles
Paul Simshold
INVENTOR.
Luther Pulliam
by Chas. D. Mooly
atty.

UNITED STATES PATENT OFFICE.

LUTHER PULLIAM, OF MIAMI, MISSOURI, ASSIGNOR OF ONE-HALF OF HIS RIGHT TO COTTON H. ALLEN, OF CHICAGO, ILLINOIS.

IMPROVEMENT IN DRAFT ATTACHMENTS FOR WAGONS.

Specification forming part of Letters Patent No. 222,306, dated December 2, 1879; application filed September 11, 1879.

*To all whom it may concern:*

Be it known that I, LUTHER PULLIAM, of Miami, Saline county, Missouri, have made a new and useful Improvement in Draft Attachments for Wagons and Carriages, of which the following is a full, clear, and exact description, reference being had to the annexed drawings, making part of this specification, in which—

Figure 1 is a plan of a wagon having the improvement; Fig. 2, a detail, on an enlarged scale, showing a portion of a single-tree and the parts immediately therewith connected; and Fig. 3, a top and a side view of the axle-clip.

The same letters denote the same parts.

I have heretofore made an improvement in draft attachments for wagons and carriages, consisting in attaching the single-trees to the ends of a chain, which passes around bearings upon the axle—that is, the chain leads from one single-tree, around a bearing upon the wagon-axle, near one end of the axle, thence around a similar bearing at the other end of the axle, and thence to the other single-tree. In place of attaching the chain directly to the single-trees, it is preferably attached to rods, which in turn are attached to the single-trees.

To hold the chain and guide, and to regulate the movements of the single-trees, the rods are arranged to move in perforations or bearings in a bar, which is in the place usually occupied by the double-tree.

By means of this construction the power used in drawing the vehicle is applied to great advantage, the draft being almost directly in the lines of the wheels, instead of leading to the center of the vehicle. This directness of draft, however, causes any sudden shock or strain, arising from the wheel or wheels encountering an obstacle, to be transmitted more directly and sharply to the horse's shoulders than when the draft is applied in the ordinary way to the center of the axle.

To obviate this difficulty, and also to provide means for keeping the draft-chain taut and holding the single-trees more evenly in place, is the aim of the present improvement, which consists in the insertion of a spring in the rear of each single-tree, substantially as hereinafter described.

Referring to the drawings, A represents a wagon having the improvement, B representing the front gear, C the hind gear, D D' the single-trees, F the chain, connected by means of the rods F' F' with the single-trees and leading around the bearings $g$ $g'$ in the clips G G'; H H, the wheels; $a$, the front axle; and J, the bar, through which the rods F' F' pass, all as in the former construction above referred to.

Now, to effect the purposes of this improvement, springs R R' are inserted between the outer ends, $f'$ $f'$, of the rods F' F' and the bar J. The springs may be of any suitable form for preventing the single-trees from being drawn suddenly back. They are preferably in the form of wire coiled around the rods F' F', and abutting at one end against the enlarged ends $f'$ $f'$, and at the other end against the bar J, as shown. The same effect, however, might be produced, so far as drawing back the single-tree is concerned, if the springs were arranged between the inner ends, $f^3$ $f^3$, of the rods F' F' and suitable bearings upon the axle $a$ or clips G G'; and a further variation might be an expanding spring, attached at its outer end to the bar J, and at its inner end to the chain F or the inner ends, $f^3$ $f^3$, of the rods. I prefer, however, the arrangement shown, for, in addition to preventing any sudden strain, the springs in the positions shown serve to keep the chain F drawn out and the single-trees upheld evenly in front of the bar J, and so as to be readily reached. The springs R R' are also useful when the hind gear, C, encounters an obstacle, especially when the coupling-chain L is used, passing from the hook $l$ around bearings $m$ $m$ upon the rear axle, $a'$, and thence to the hook $l'$, as in the former application.

To enable the tongue to vibrate vertically in the hounds Q the rods K K are jointed at their inner ends to the plates $k$ $k$, which are upon the hounds.

The clips G G', as well as those upon the rear axle, are preferably made in two similar parts, $g^2$ and $g^3$, as shown in Fig. 3, which, after being put upon the axle, are fastened together in front by the bolt $g^4$, which holds the pulleys $g$ $g'$, and in the rear by a rivet, $g^5$.

So far as holding the chain F taut is concerned, and preventing the sudden withdrawal of the single-trees, the springs R R' would suffice if the rods F F' were dispensed with and the chain F extended to connect directly with the single-trees.

I claim—

1. The combination of the tongue P, hounds Q, the bar J, and the braces K K jointed to the plates $k$ $k$, as and for the purpose described.

2. The combination of the front and hind gears, B C, chain L, hooks $l$ $l'$, bearings M M, single-trees D D', rods F' F', chain F, bearings $g$ $g'$, bar J, springs R R', hounds Q, tongue P, and braces K K, substantially as described, and for the purposes set forth.

3. The combination of the single-trees D D', rods F' F', chain F, axle-tree $a$, bearings $g$ $g'$, bar J, and springs R R', substantially as described.

4. The combination of the single-trees D D', rods F' F', chain F, axle $a$, bearings $g$ $g'$, bar J, springs R R', hounds Q, tongue P, and braces K K, substantially as described.

L. PULLIAM.

Witnesses:
CHAS. D. MOODY,
CHARLES PICKLES.